No. 861,183. PATENTED JULY 23, 1907.
H. L. IDE.
AUTOMOBILE.
APPLICATION FILED JAN. 7, 1907.
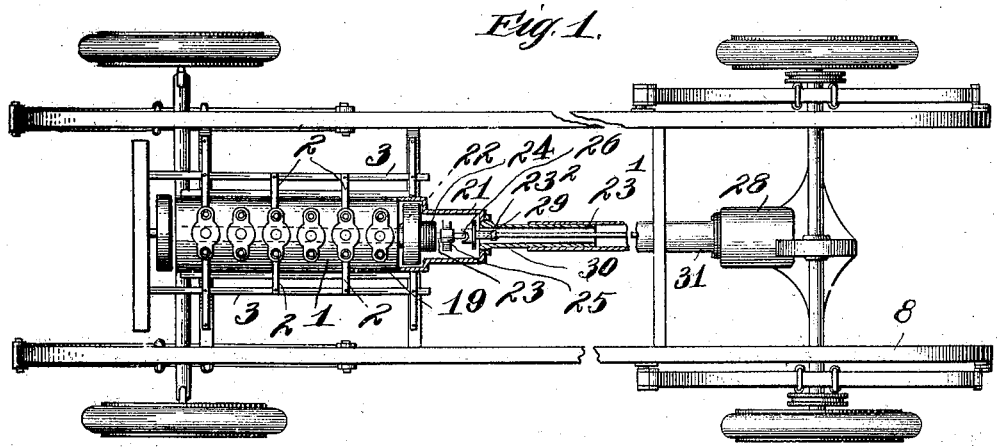
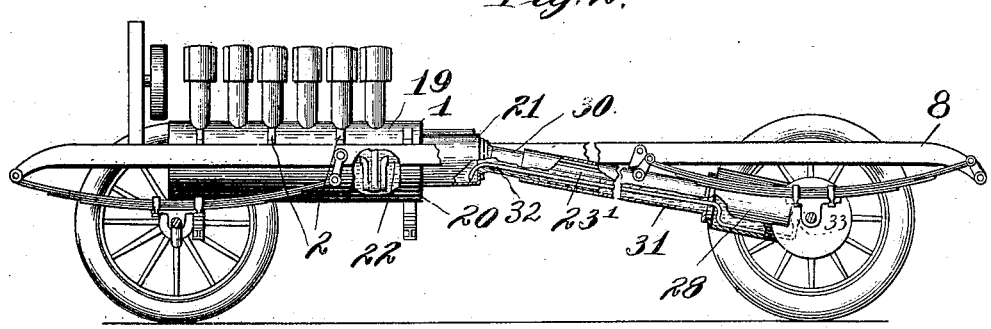
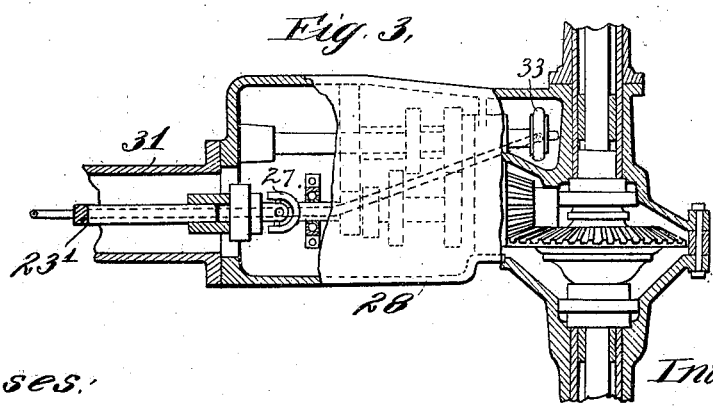
Witnesses:
Inventor:
Harry L. Ide,
By

UNITED STATES PATENT OFFICE.

HARRY L. IDE, OF SPRINGFIELD, ILLINOIS.

AUTOMOBILE.

No. 861,183.   Specification of Letters Patent.   Patented July 23, 1907.

Original application filed August 15, 1906, Serial No. 330,746. Divided and this application filed January 7, 1907. Serial No. 351,073.

*To all whom it may concern:*

Be it known that I, HARRY L. IDE, a citizen of the United States, residing at Springfield, in the county of Sangamon and State of Illinois, have invented a certain new and useful Improvement in Automobiles, being a division of my original application, Serial No. 330,746, filed August 15, 1906, of which the following is a full, clear, concise, and exact description, reference being had to the accompanying drawings, forming a part of this specification.

My invention relates to automobiles, and has several objects in view.

My invention has for a general object the provision of improved apparatus for permitting effective lubrication of working parts of the automobile and the provision of an improved housing for working parts of the transmission mechanism.

My invention will fully appear from the following description of the accompanying drawing, showing the preferred embodiment thereof, in which—

Figure 1 is a plan view of the frame and running gear portion of the automobile, the body being eliminated, as it is not essential in the illustration of the invention, and in order that the essential features of the invention may clearly appear. Fig. 2 is a side elevation of the construction shown in Fig. 1, with the two inner wheels removed. Fig. 3 is a detail view illustrating the rear gear case, the pump and some of the gearing therein, the pump being preferably adapted to effect circulation of the oil or equivalent lubricant.

Like parts are indicated by similar characters of reference throughout the different figures.

The engine 1, of any suitable type, is provided with a number of outsetting arms 2 that are secured at their outer ends to the longitudinal members of a cradle 3, which cradle thereupon becomes a supporting part of the engine frame.

When an engine of the type illustrated is employed, I preferably provide a single crank or shaft case 19 common to all of the units of the engine, which crank case may have a detachable section, as indicated at 20, which, by reason of the employment of the cradle, may be very readily removed and replaced. If desired, this crank case may be filled with lubricating oil for lubricating various bearings, which same lubricating oil I preferably, though not necessarily, employ for lubricating bearings that are not directly included in the engine construction but which are included in the transmission mechanism affording driving connection between the engine and the traction wheels of the automobile.

I preferably employ a case, 21, which incloses the mechanism that establishes the union between the main driving shaft 22 of the engine and the transmission shaft 23, this case 21 constituting a continuation of the crank or shaft case 19 and being virtually a part thereof. In the embodiment of the invention shown, the instrumentality that affords the connection between the shafts 22 and 23 is a well known clutch mechanism, illustrated at 24.

The case 19, 21 desirably contains lubricating oil to lubricate the various bearings that are afforded for the shaft 23 and other bearings in the transmission gear. One of these bearings 25 for said shaft 23 is provided in the case 21 and a universal joint 26, included in the shaft 23, is also contained in the said case 21. The rear portion of the shaft 23 includes a universal joint 27 that properly permits the driving connection between the shaft 23 and the gearing interposed between the said shaft and the driving shaft of the automobile, in a manner so well known as not to require detailed description or illustration.

In order that the shaft 23 will not buckle or bind as the rear of the engine moves with respect to the wheel shaft or main frame 8 of the automobile, the shaft 23 has a portion $23^1$, preferably made square in cross-section, which engages a correspondingly shaped bore in the section $23^2$ of the shaft 23.

The shaft 23 is desirably inclosed not only for the purpose of protecting the working parts from dust and dirt, but also preferably for the purpose of affording a passage for lubricating oil from the crank case 21 to the gear case 28 at the rear of the shaft 23. To this end, I employ a tube having at one end a ball and socket union at 29 with the case 21 to afford a universal connection, and at the other end being provided with some such suitable connection with the case 28, as indicated. The joint 29 permits of communication between the interior of the case 21 and the interior of said tube, while at the same time the engine may rock or the tube may rock without disturbing the union between the case and tube. In order that the rear part of the automobile mechanism may twist and move with respect to the forward mechanism of the automobile, the said tube is formed in two sections 30 and 31, one of which is inclosed by the other, and between which relative rotation may be afforded. In order that there may be relative longitudinal movement between the front mechanism and the rear mechanism of the automobile, the said sections 30, 31 of the tube are not only permitted relative rotary movement but are also adapted to slide with respect to each other. In order that the said tube may act as a conveyer for lubricant, the space between the sections 30, 31 is made sufficiently oil tight, as are the connections between the said tube and the cases united thereby. The tube 30, 31 constitutes a flexible connection between the cases, 21, 28 and affords communication between these cases whereby oil contained in the case 21 may find access through the said tube into the gear case 28. A duct 32 permits return of the oil from case 28 to the case 21, said duct preventing the accumulation of too much oil in the case 28. The return flow of the oil may be promoted by means of a small pump 33, of any suitable construction, and which may be operated by the gearing in the case 28. It is, of course, understood that the gearing in the case 28 operates the rear shaft upon which the rear wheels of the automobile are provided and that the tubing 30, 31 and the case 21 form with the cases 19 and 28 a substantially continuous inclosure for the elements of the transmission mechanism operated by the motor.

I do not deem it necessary to describe any further features of the automobile illustrated, as the drawing is very clear.

It will be observed that the universal joints at the end of the telescoping shaft are contained in cases. The upper universal joint is in the shaft case, while the lower universal joint is in the gear case. In this way, both universal joints may be thoroughly lubricated by lubricant contained in these cases, which lubricant is agitated by the moving parts therein.

Certain characteristics herein illustrated form the subject-matter of my original application Serial No. 330,746, filed August 15, 1906, of which this is a division.

While I have herein shown and particularly described the preferred embodiment of the invention, it is obvious that changes may be made therein without departing from the spirit of the invention, and I do not, therefore, wish to be limited to the precise construction shown, but,

Having thus described my invention, I claim as new and desire to secure by Letters-Patent:—

1. An automobile including its frame mounted upon wheels, gearing operating upon one of the wheel shafts of the automobile a casing inclosing said gearing, a motor having a shaft case, and a tubular connection between said cases, there being communication between the cases by way of the tubular connection to afford passage for lubricant from one case to the other.

2. An automobile including its frame mounted upon wheels, gearing operating upon one of the wheel shafts of the automobile a case inclosing said gearing, a motor having a shaft case, a tubular connection between said cases, there being communication between the cases by way of the tubular connection to afford passage for lubricant from one case to the other, and mechanism for effecting circulation of the lubricant through said tubular connection and cases.

3. An automobile including its frame mounted upon wheels, gearing operating upon one of the wheel shafts of the automobile, a case inclosing said gearing, a motor having a shaft case, a shaft having driving connection with said gearing and said motor, and a tubular connection between said cases effecting communication between the same and inclosing the shaft, said tubing having universal connection with the shaft case.

4. An automobile including its frame mounted upon wheels, gearing operating upon one of the wheel shafts of the automobile, a case inclosing said gearing, a motor having a shaft case, a shaft having driving connection with said gearing and said motor, and a tubular connection formed in telescoping sections between said cases effecting communication between the same and inclosing the shaft.

5. An automobile including its frame mounted upon wheels, gearing operating upon one of the wheel shafts of the automobile, a case inclosing said gearing, a motor having a shaft case, a shaft having driving connection with said gearing and said motor, and a tubular connection formed in telescoping sections, between said cases, effecting communication between the same and inclosing the shaft, said tubing having universal connection with the shaft case.

6. An automobile including its frame mounted upon wheels, gearing operating upon one of the wheel shafts of the automobile, a case inclosing said gearing, a motor having a shaft case, a shaft having driving connection with said gearing and said motor, and a tubular connection, formed in relatively rotatable sections between said cases, effecting communication between the same and inclosing the shaft.

7. An automobile including its frame mounted upon wheels, gearing operating upon one of the wheel shafts of the automobile, a case inclosing said gearing, a motor having a shaft case, a shaft having driving connection with said gearing and said motor, and a tubular connection formed in relatively rotatable sections between said cases, effecting communication between the same and inclosing the shaft, said tubing having universal connection with the shaft case.

8. An automobile including its frame mounted upon wheels, gearing operating upon one of the wheel shafts of the automobile, a case inclosing said gearing, a motor having a shaft case, a shaft having driving connection with said gearing and said motor, and a tubular connection formed in telescoping and relatively rotatable sections between said cases, effecting communication between the same and inclosing the shaft.

9. An automobile including its frame mounted upon wheels, gearing operating upon one of the wheel shafts of the automobile, a case inclosing said gearing, a motor having a shaft case, a shaft having driving connection with said gearing and said motor, and a tubular connection formed in telescoping and relatively rotatable sections between said cases, effecting communication between the same and inclosing the shaft, said tubing having universal connection with the shaft case.

10. An automobile including its frame mounted upon wheels, gearing operating upon one of the wheel shafts of the automobile, a case inclosing said gearing, a motor, a shaft having driving connection with said gearing and said motor, and a tube formed in telescoping sections, extending from said case and inclosing the shaft, the other end of said tubing having a universal suspension.

11. An automobile including its frame mounted upon wheels, gearing operating upon one of the wheel shafts of the automobile, a case inclosing said gearing, a motor, a shaft having driving connection with said gearing and said motor, and a tube formed in relatively rotatable sections, extending from said case and inclosing the shaft, the other end of said tubing having a universal suspension.

12. An automobile including its frame mounted upon wheels, gearing operating upon one of the wheel shafts of the automobile, a case inclosing said gearing, a motor, a shaft having driving connection with said gearing and said motor, and a tube formed in telescoping and relatively rotatable sections, extending from said case and inclosing the shaft, the other end of said tubing having a universal suspension.

13. An automobile including its frame mounted upon wheels, gearing operating upon one of the wheel shafts of the automobile, a case inclosing said gearing, a motor having a shaft case, a shaft having driving connection with said gearing and said motor, and a tubular connection between said cases effecting communication between the same and inclosing the shaft.

14. An automobile including its frame mounted upon wheels, gearing operating upon one of the wheel shafts of the automobile, a case inclosing said gearing, a motor having a shaft case, a shaft having driving connection with said gearing and said motor, a tubular connection between said cases effecting communication between the same and inclosing the shaft, and mechanism for effecting circulation of lubricant through the tube and cases.

15. An automobile including its frame mounted upon wheels, gearing operating upon one of the wheel shafts of the automobile, a case inclosing said gearing, a motor having a shaft case, a shaft having driving connection with said gearing and said motor, a tubular connection between said cases effecting communication between the same and inclosing the shaft, said tubing having universal connection with the shaft case, and mechanism for effecting circulation of lubricant through the tube and cases.

16. An automobile including its frame mounted upon wheels, gearing operating upon one of the wheel shafts of the automobile, a case inclosing said gearing, a motor having a shaft case, a shaft having driving connection with said gearing and said motor, a tubular connection formed in telescoping sections between said cases, effecting communication between the same and inclosing the shaft, and mechanism for effecting circulation of lubricant through the tube and cases.

17. An automobile including its frame mounted upon wheels, gearing operating upon one of the wheel shafts of the automobile, a case inclosing said gearing, a motor having a shaft case, a shaft having driving connection with said gearing and said motor, a tubular connection formed in telescoping sections, between said cases, effecting communication between the same and inclosing the shaft, said tubing having universal connection with the shaft case, and mechanism for effecting circulation of lubricant through the tube and cases.

18. An automobile including its frame mounted upon wheels, gearing operating upon one of the wheel shafts of the automobile, a case inclosing said gearing, a motor having a shaft case, a shaft having driving connection with said gearing and said motor, a tubular connection formed in relatively rotatable sections between said cases, effecting communication between the same and inclosing the shaft, and mechanism for effecting circulation of lubricant through the tube and cases.

19. An automobile including its frame mounted upon wheels, gearing operating upon one of the wheel shafts of the automobile, a case inclosing said gearing, a motor having a shaft case, a shaft having driving connection with said gearing and said motor, a tubular connection formed in relatively rotatable sections between said cases, effecting communication between the same and inclosing the shaft, said tubing having universal connection with the shaft case, and mechanism for effecting circulation of lubricant through the tube and cases.

20. An automobile including its frame mounted upon wheels, gearing operating upon one of the wheel shafts of the automobile, a case inclosing said gearing, a motor having a shaft case, a shaft having driving connection with said gearing and said motor, a tubular connection formed in telescoping and relatively rotatable sections between said cases, effecting communication between the same and inclosing the shaft, and mechanism for effecting circulation of lubricant through the tube and cases.

21. An automobile including its frame mounted upon wheels, gearing operating upon one of the wheel shafts of the automobile, a case inclosing said gearing, a motor having a shaft case, a shaft having driving connection with said gearing and said motor, a tubular connection formed in telescoping and relatively rotatable sections between said cases, effecting communication between the same and inclosing the shaft, said tubing having universal connection with the shaft case, and mechanism for effecting circulation of lubricant through the tube and cases.

22. An automobile including its frame mounted upon wheels, an operating motor having a shaft case, gearing in operating connection with a wheel shaft of the automobile, a driving shaft connecting the said motor and gearing and provided with a universal joint for effecting its connection with the motor, said universal joint being contained within the shaft case and adapted to be lubricated by lubricant contained in the shaft case.

23. An automobile including its frame mounted upon wheels, gearing in driving connection with the wheel shaft, a motor, a shaft affording driving connection between the motor and said gearing, and a tube formed in telescoping sections and having a support independent of the shaft.

24. An automobile including its frame mounted upon wheels, gearing in driving connection with a wheel shaft, a motor, a shaft affording driving connection between the motor and said gearing, and a tube formed in telescoping and relatively rotatable sections and having a support independent of the shaft, the tubing surrounding said shaft.

25. An automobile including its frame mounted upon wheels, gearing in driving connection with a wheel shaft, a motor, a shaft affording driving connection between the motor and said gearing, and a tube formed in relatively rotatable sections and having a support independent of the shaft, the tubing surrounding said shaft.

26. An automobile including its frame mounted upon wheels, an operating motor, gearing in operating connection with a wheel shaft of the automobile, a driving shaft connecting the said motor and gearing and provided with a universal joint for effecting its connection with the gearing, a case for the gearing containing the universal joint and adapted to contain lubricant to lubricate said joint, said shaft also having a universal joint for connecting the same with the motor, and a shaft case for the motor containing the latter universal joint and adapted to contain lubricant to lubricate said joint.

In witness whereof, I have hereunto subscribed my name this fourth day of January A. D., 1907.

HARRY L. IDE.

Witnesses:
ADA S. AYERS,
H. C. McREYNOLDS.